United States Patent Office 3,793,391
Patented Feb. 19, 1974

3,793,391
CATALYSTS AND PROCESS FOR OXIDATIVE DEHYDROGENATION
Brent J. Bertus, Bartlesville, Okla., assignor to Phillips Petroleum Company
No Drawing. Filed Feb. 10, 1972, Ser. No. 225,284
Int. Cl. C07c 3/28
U.S. Cl. 260—683.3      11 Claims

ABSTRACT OF THE DISCLOSURE

Catalyst compositions prepared from (I) a transition metal compound, such as nickel oxide, (II) a tin compound, and (III) a Group II–A metal compound, such as magnesium oxide, are effective in a process to convert paraffins or monoolefins to a greater degree of unsaturation.

BACKGROUND OF THE INVENTION

This invention relates to dehydrogenation catalysts. The invention further relates to dehydrogenation processes utilizing the catalyst compositions.

A variety of oxidation dehydrogenation catalyst compositions and systems are known. However, the search for better and more effective catalyst compositions and processes continues.

It is an object of my invention to provide effective catalyst compositions. It is another object of my invention to provide effective yields of desired products through dehydrogenation processes.

Other aspects, objects, and the several advantages of my invention will become further apparent to those skilled in the art to which my invention most nearly pertains upon consideration of my disclosure as presented in this specification including the appended claims.

SUMMARY OF THE INVENTION

According to my invention, a catalyst composition is formed by the combination of (I) a transition metal-containing component, i.e., a compound of iron, cobalt, or nickel, (II) a tin-containing component, and (III) a Group II–A metal-containing component. These components, when formed into catalyst compositions, exhibit effective properties and abilities to convert a paraffin to an olefin, such as a butane to butene, or to convert a 1-monoolefin to a diene, such as a butene to the correspond butadiene.

DETAILED DESCRIPTION OF THE INVENTION

Catalyst compositions

The catalyst compositions of my invention are prepared from a combination of (I) a transition metal-containing component of the Fourth Period of Group VIII of the Periodic Table, (II) a tin-containing component, and (III) a Group II–A metal-containing component. The transition metal-containing component to which I refer are compounds of one or more of iron, cobalt, and nickel. Hereafter, I refer to such components as the "nickel group" for simplicity. The Group II–A metal-containing components are, of course, selected from one or more compounds of beryllium, magnesium, calcium, strontium, or barium.

The catalyst compositions can be prepared by any suitable method known to the arts for preparation of such compositions. Conventional methods include coprecipitation from aqueous or organic or combination solutions-dispersions, impregnation, dry mixing, or the like, alone, or in various combinations. In general, any methods can be used which provide catalytic compositions containing the prescribed components in catalytically effective proportions. It is preferred that the final compositions have a suitably high surface area so as to permit effective catalytic operations, and it is presently preferred that the compositions have a catalytical surface area of at least about one square meter per gram.

In the catalyst compositions according to my invention, the relative amounts of each component can vary widely, such as from about 10 to 75 weight percent for the nickel group component, from about 1 to 50 weight percent for the tin component, and from about 0.5 to 60 weight percent for the Group II–A metal component, each component being expressed as the element itself. Of course, the total amounts generally would not equal 100 percent, since the elements contained in the catalyst can be, but are not necessarily in the elemental state. The elements can be combined with sufficient oxygen and/or sulfur to form one or more compounds with the necessary valence requirements satisfied by the oxygen or sulfur. Hence, oxygen or sulfur then represent the remainder of a percentage composition calculation between the three components of my composition and 100. It is presently preferred that the catalytic compositions reflect a range of from about 15 to 60 weight percent for the nickel group component, from about 10 to 45 weight percent for the tin component, and from about 2 to 25 weight percent for the Group II–A metal component, each component again expressive of the metal. Of course, two or more components from each group can be utilized to form my catalyst compositions.

Substantially any compound or compounds of the aforementioned elements can be employed in such preparations, so long as none of the compounds are detrimental to the final oxidative dehydrogenation effectiveness of the catalyst composition, and so long as elements other than oxygen or sulfur in such compounds as are employed are substantially removed from the final catalyst compositions by appropirate washing or volatilization steps including drying and calcining. Of course, relatively minor amounts of some elements which are present as trace constituents in compounds being employed, or are present in a combined form not completely eliminated, are not detrimental as long as they do not interfere in the effectiveness of my catalysts.

The (I) nickel group compounds broadly can be employed, including the presently preferred oxides or compounds convertible to the oxides on drying or calcining such as the hydroxide or nitrates, as well as the halides including fluoride, bromide, iodide, the halates including the bromates and other equivalent halates, carboxylates such as acetates, propionates, tartrates, oxalates, and the like, all are useful as well as mixtures thereof. Presently preferred are compounds of nickel.

The (II) tin compounds also can be any applicable tin compound with the qualifications as discussed above for the nickel group components.

The (III) Group II–A metal component also can be applicable compound of a Group II–A metal, subject to the qualifications as described above for the nickel group component. Presently preferred are compounds of magnesium.

It should be noted that any of the known double compounds also are useful, such as nickel stannate, or calcium stannate, and the like, and such compounds can be utilized in preparation of compositions according to my invention.

While any method known to the art of catalyst preparation can be utilized in preparing my compositions, one suitable and illustrative method of catalyst preparation involves dry mixing one or more compounds of one or more components from each group, then adding sufficient water or other convenient diluent or slurry-forming liquid so as to make a workable slurry, and intimately mixing the components. The slurry is dried to form a dried composite, usually at a temperature sufficient to volatilize the water or other diluent, such as from about 220 to 450° F. The dried composite is activated by employing an elevated calcining temperature, which temperature can be of the order of 900 to about 1200° F., over a time suitable for proper activation, such as from 1 to about 24 hours, and including exposure of the composite during the calcination step to a molecular oxygen-containing gas such as air.

The catalyst compositions can be formed into any conventional shape or structure for utilization. The catalyst compositions can be prepared in the form of tablets, extrudates, finely divided powders, agglomerates, and the like, by means known to the art. For convenience in shaping, such particle-forming steps preferably are conducted before calcining.

The catalyst compositions can be prepared with or without a support. Where desired for strength or for catalyst distribution in various types of reactors, conventional supports can be utilized such as silica, boria, titania, zirconia, various types of alumina, and the like, as are well known in the art. When a support is utilized, the aforementioned weight ratios are exclusive of such support.

Dehydrogenation feedstocks

Organic feedstocks to which my catalysts can be applied in dehydrogenation processes are those feedstreams containing one or more dehydrogenatable organic compounds. Such compounds can be characterized as containing at least one

grouping. The compounds to be treated typically contain in the range of from 2 to 12 carbon atoms per molecule. It is feasible to treat compounds containing a greater number of carbon atoms, although such may not be readily commercially available. The upper carbon limitation just mentioned does not indicate a limitation on the effectiveness of my catalysts and process, but only refers to what may be commercially available in the way of feedstocks.

Particularly applicable for my process and catalysts are the paraffins, including cyclic and acyclic, more particularly the acyclic, and the monoolefins. Such feedstocks can be utilized as a relatively pure feedstock, i.e., a single compound, or can be mixed feedstocks available from various refinery streams and containing a variety of components. The compounds to be dehydrogenated can be of branched or unbranched structure. The conversion of butane to butenes, butane to butenes and butadiene, isopentane to isoamylenes and isoprene, and butenes to butadiene, presently are considered most advantageous. Representative other feedstocks or feedsotck components include ethane, isobutane, pentane, hexane, 2-methyl-hexane, octane, 2,4-dimethyloctane, 2-methylbutene-1, hexene-2, octene-1, 3-methylnonene-4, dodecene-1, and the like.

Dehydrogenation conditions

In dehydrogenation processes, particularly oxidative dehydrogenation processes, the hydrocarbon feedstock, together with a molecular oxygen-containing gas, and optionally with steam, is formed into an admixture usually preheated, and contacted with my catalyst composition in any suitable reaction zone at desired contacting temperatures for a time suitable for the degree or extent of conversion desired. The catalyst compositions can be utilized in any contacting method or reactor known to the catalyst and dehydrogenation arts, and any mode of contact, such as the presently preferred fixed catalyst bed, or by other contacting methods such as fluidized beds.

Hydrocarbon feedstocks can be dehydrogenated with the process and using the catalyst compositions according to my invention at contacting temperatures over a broad range, such as from about 800 to 1300° F., preferably at present from about 1000 to 1200° F. for improved conversion and selectivity; and at any convenient contacting pressure, such as from about 7 to 250 p.s.i.a.; and utilizing a hydrocarbon:oxygen ratio of about 1:0.1 to about 1:4, preferably from about 1:0.5 to 1:1.5.

The use of steam frequently is beneficial for heat transfer purposes in order to remove heat of reaction, and where steam is so-employed, a steam:hydrocarbon ratio of up to about 50:1 can be utilized. Hydrocarbon feed rate can be any contacting range known in the dehydrogenation art, such as from about 50 to 5000 GHSV, preferably from 200 to 1000 GHSV.

The effluent from the reaction zone can be subjected to any suitable separation method so as to isolate and recover desired product or products, to separate unconverted or partially converted feeds or components for recycle or for other use in the modern integrated chemical refinery or petrochemical processing operation which more and more frequently is being termed a petrocomplexity.

My catalyst compositions, employed under appropriate conditions, have a long, active life and seldom need, if ever, to undergo regeneration. However, should regeneration become indicated or is desired, according to operational controls, or because of inactivation possibly attributable to minor amounts of poisons in the feedstock or for other reasons, my catalyst compositions can be readily regenerated. Regeneration can be accomplished by ceasing the flow of feedstock, continuing the flow of oxygen-containing gas, preferably also of steam where such is used, and otherwise maintaining operating conditions of temperature and the like for a sufficient time to restore substantial activity to the catalyst compositions.

In processes and reactions of my invention, carbon oxides and water of course are formed either by chemical reactions, or in the case of water also by condensation of steam in recovery of the products. Trace amounts of other oxygenated products usually also are formed. For example, trace amounts of compounds such as furan, aldehydes such as acetaldehyde, furfural, minor amounts of acids such as acetic acid, can be obtained. Some minor amounts of cracking products also may be formed which may be desirable, such as butadiene as a byproduct of oxidative dehydrogenation of isopentane to isoprene.

EXAMPLES

The following examples serve to illustrate the use of my catalyst compositions. These examples, and the particular components and conditions as used therein, are intended to be illustrative of my invention and not limitative of the reasoable and proper scope thereof.

Example I

A catalyst composition according to my invention was prepared by admixing 25 g. of NiO, 20 g. of $MgSO_4 \cdot 7H_2O$ and 10 g. of $SnO_2$. The components were dry mixed, and the dry mixture then wetted with sufficient distilled water to form a workable slurry. The slurry was dried at about 300° F. The dried composite was calcined in air at about 1200° F. overnight. The catalyst composition was ground and screened to 20 to 35 mesh. This catalyst contained 35.6% Ni, 3.6% Mg, and 14.3% Sn, by weight, expressed as the respective elements.

The catalyst prepared as described was used in a process to promote the oxidative dehydrogenation of paraffin, using n-butane and a fixed bed catalytic reactor, employing atmospheric pressure, at feed rates of butane 50 GHSV, oxygen 50 GHSV, and steam 582 GHSV. After 1 hour on stream, the gaseous effluent from the reaction zone was sampled and analyzed by gas-liquid chromatography. From these results, the conversion and yields to various products were calculated. The results of runs made at 900° F., 1050° F., and 1100° F., are shown in Table I, with all results expressed in terms of moles of specified product per 100 moles of butane feed.

catalyst of my invention, and that appropriate flow rates are readily determinable.

TABLE II

| Run No. | GHSV | | | Temp. | Conversion | Modivity | Yield | | |
|---|---|---|---|---|---|---|---|---|---|
| | C₄H₁₀ | O₂ | H₂O | | | | Total | C₄H₈ | C₄H₆ |
| 4 | 50 | 55 | 500 | 1,050 | 18.5 | 32.7 | 6.1 | 1.1 | 5 |
| 5 | 50 | 55 | 500 | 1,100 | 28.2 | 26.6 | 7.5 | 1.6 | 6.9 |
| 6 | 500 | 550 | 5,000 | 1,000 | 17.5 | 58.0 | 10.1 | 7.8 | 2.3 |
| 7 | 500 | 550 | 5,000 | 1,050 | 24.4 | 54.4 | 13.3 | 9.7 | 3.6 |
| 8 | 500 | 550 | 5,000 | 1,100 | 30.0 | 51.1 | 15.3 | 10.5 | 4.8 |
| 9 | 200 | 250 | 2,000 | 1,050 | 34.1 | 55.5 | 18.9 | 11.2 | 7.7 |
| 10 | 200 | 250 | 2,000 | 1,150 | 40.4 | 39.6 | 16.0 | 5.7 | 10.3 |

TABLE I.—OXIDATIVE DEHYDROGENATION OF n-BUTANE

| | Run | | |
|---|---|---|---|
| | 1 | 2 | 3 |
| Temperature, °F., at | 900 | 1,050 | 1,100 |
| Conversion to: | | | |
| Cracked products: | | | |
| C₁ | 0 | 0.2 | |
| C₂ + C₃ | 0.7 | 3.5 | |
| Total | 0.7 | 3.7 | 5.6 |
| Oxidized products: | | | |
| CO | 1.1 | 0 | |
| CO₂ | 12.5 | 16.5 | |
| Total | 13.6 | 16.5 | 17.5 |
| Dehydrogenation products: | | | |
| Butene-1 | 4.4 | 2.92 } | 5.3 |
| Butene-2 | 4.3 | 4.50 } | |
| Butadiene | 6.17 | 11.68 | 12.0 |
| Total | 14.87 | 19.10 | 17.3 |
| Total conversion | 29.2 | 39.3 | 40.5 |
| Modivity: | | | |
| Butenes | 29.8 | 18.8 | |
| Butadiene | 21.1 | 29.7 | |
| Total | 51.0 | 48.6 | 42.8 |
| Oxygen in product | 21.1 | 0 | |

Example III

Further catalyst compositions were made according to my invention, employing the methods of catalyst preparation as described in Example I. The relative weight percentages of the several components were varied. The several catalysts so prepared were utilized in an oxidative dehydrogenation conversion of n-butane utilizing a n-butane flow rate of 200 GHSV, oxygen 200 GHSV, and steam 2000 GHSV. Each catalyst was employed under the same conditions except under two different contacting temperatures. 1000° F. and 1100° F., in order to observe not only effects in varying the catalyst composition ratios, but in oxidative dehydrogenation contacting temperatures. The catalysts so employed and results obtained are shown in Table III, results again expressed in mole percent.

These data again reflect the highly effective nature of the catalyst compositions of my invention, and that a wide range in relative ratios can be employed in preparing the catalyst composition but still obtain high effectiveness in conversion, modivity, or both.

TABLE III

| Run number | Wt. percent | | | Temp., °F. | Conversion | Modivity | Yield | |
|---|---|---|---|---|---|---|---|---|
| | Ni | Mg | Sn | | | | C₄H₆ | C₄H₈ |
| 11 | 28.8 | 7.3 | 21.5 | 1,000 | 20.7 | 45.6 | 6.6 | 2.8 |
| 12 | 28.8 | 7.3 | 21.5 | 1,100 | 33.9 | 43.4 | 7.3 | 7.4 |
| 13 | 32.9 | 8.3 | 13.1 | 1,000 | 14.9 | 55.9 | 6.1 | 2.2 |
| 14 | 32.9 | 8.3 | 13.1 | 1,100 | 31.1 | 44.0 | 8.2 | 5.5 |
| 15 | 14.4 | 7.3 | 35.9 | 1,000 | 14.7 | 58.3 | 6.9 | 1.7 |
| 16 | 14.4 | 7.3 | 35.9 | 1,100 | 36.1 | 33.4 | 8.3 | 2.8 |
| 17 | 15.8 | 12.0 | 15.8 | 1,000 | 12.8 | 55.4 | 5.8 | 1.3 |
| 18 | 15.8 | 12.0 | 15.8 | 1,100 | 33.3 | 30.7 | 7.8 | 2.4 |
| 19 | 39.5 | 3.3 | 26.3 | 1,000 | 27.0 | 57.2 | 8.8 | 6.7 |
| 20 | 39.5 | 3.3 | 26.3 | 1,100 | 35.9 | 44.6 | 6.7 | 9.3 |
| 21 | 15.8 | 8.0 | 31.6 | 1,000 | 11.2 | 58.5 | 5.7 | 0.8 |
| 22 | 15.8 | 8.0 | 31.6 | 1,100 | 33.3 | 32.0 | 9.4 | 1.3 |

Modivity is defined as a modified selectivity calculated from analyses of gas-phase products for converted hydrocarbons, oxides of carbon, and unconverted butane.

The above runs demonstrate effective conversion of a paraffin to desirable products, n-butane to butenes and butadiene, and with effective modivity.

Example II

A catalyst composition prepared as described in Example I and of the same composition was utilized in an oxidative dehydrogenation reaction using n-butane as feedstock, and varying the flow rates of the various components in order to observe the effect of retention time on product distribution. Retention time was changed by changing flow rates. Results obtained are shown in Table II, results given in mole percent, which would be same as moles of specified product per 100 moles of butene feed.

It is readily observed from the above data that desirable conversion and modivity are obtained by the use of the Example IV The catalyst as described in Example II was employed in further runs utilizing n-butane as feedstock, and employing a hydrocarbon feed rate of 500 GHSV, oxygen 530 GHSV, steam 4390 GHSV. The following results in mole percent were obtained.

TABLE IV

| | Temp., °F | Conversion | Modivity | C₄H₆ | C₄H₈ |
|---|---|---|---|---|---|
| Run number: | | | | | |
| 23 | 1,000 | 17.5 | 58.0 | 2.3 | 7.7 |
| 24 | 1,050 | 24.4 | 54.4 | 3.6 | 9.7 |
| 25 | 1,100 | 30.0 | 51.1 | 4.8 | 10.5 |

The same catalyst composition was employed in further runs employing a hydrocarbon flow rate of 250 GHSV, oxygen 250 GHSV, steam 2145 GHSV, at various contacting temperatures, to further illustrate the effectiveness and range of operation of my catalysts. Results obtained, expressed in mole percent, were as follows.

TABLE V

| Run number: | Temp., °F. | Conversion | Modivity | C₄H₆ | C₄H₈ |
|---|---|---|---|---|---|
| 26 | 950 | 29.3 | 55.8 | 5.7 | 10.6 |
| 27 | 1,050 | 34.1 | 55.5 | 7.7 | 11.2 |
| 28 | 1,150 | 40.4 | 39.6 | 10.3 | 5.7 |

These data further reflect the operational variability and usefulness of the catalyst of my composition.

The disclosure and data have shown the value and effectiveness of my invention. Reasonable variations and modifications are certainly possible within my disclosure without departing from the reasonable scope and spirit thereof.

I claim:

1. An oxidative dehydrogenation process comprising admixing at least one dehydrogenatable organic compound containing at least one

grouping with a molecular oxygen-containing gas, and thereafter contacting the resulting admixture under oxidative dehydrogenation conditions with a catalyst composition consisting essentially of effective oxidative dehydrogenation catalyst ratios of (I) cobalt, (II) tin, (III) a Group II-A metal, and (IV) oxygen or sulfur.

2. The process according to claim 1 wherein said process further employs steam.

3. The process according to claim 2 wherein said at least one dehydrogenatable organic compound is a paraffin or monoolefin, and said compound contains from 2 to 12 carbon atoms per molecule.

4. The process according to claim 3 wherein said oxidative dehydrogenation conditions include a contacting temperature of 800 to 1300° F., a contacting pressure of 7 to 250 p.s.i.a., a hydrocarbon:oxygen ratio of 1:0.1 to 1:4, a steam:hydrocarbon ratio of up to about 50:1, and a hydrocarbon feed rate of 50 to 5000 GHSV.

5. The process according to claim 4 wherein said contacting temperature is from 1000 to 1200° F., said hydrocarbon:oxygen ratio is from 1:0.5 to 1:1.5, and said hydrocarbon feed rate is from 200 to 1000 GHSV.

6. The process according to claim 4 wherein (III) is magnesium.

7. The process according to claim 6 wherein said hydrocarbon is a paraffin.

8. The process according to claim 7 wherein said paraffin is n-butane.

9. The oxidative dehydrogenation process according to claim 1 wherein in said catalyst composition said (I) represents about 10 to 75 weight percent, said (II) about 1 to 50 weight percent, and said (III) about 0.5 to 60 weight percent, based on the total weight of said (I), (II), and (III), each of which is expressed as the element itself, and wherein the total weight of finished catalyst composition excluding support if any and 100 is satisfied by said (IV) oxygen or sulfur.

10. The oxidative dehydrogenation process according to claim 9 wherein said (I) represents about 15 to 60 weight percent, said (II) about 10 to 45 weight percent, and said (III) about 2 to 25 weight percent.

11. The oxidative dehydrogenation process according to claim 9 wherein further is included in said catalyst composition a support selected from the group consisting of silica, boria, titania, zirconia, or mixture thereof.

References Cited

UNITED STATES PATENTS

| 3,686,340 | 8/1972 | Patrick et al. | 260—683.3 |
| 3,531,543 | 9/1970 | Clippinger et al. | 260—683.3 |
| 3,631,215 | 12/1971 | Clippinger et al. | 260—673.5 |
| 3,274,284 | 9/1966 | Kapkalits et al. | 260—680 R |
| 2,395,876 | 3/1946 | Kearby | 260—680 R |
| 3,207,806 | 9/1965 | Bajars | 260—680 R |
| 3,670,044 | 6/1972 | Drehman et al. | 260—683.3 |
| 3,539,651 | 11/1970 | Hepp et al. | 260—680 |
| 3,641,182 | 2/1972 | Box et al. | 260—680 R |
| 2,861,959 | 11/1958 | Thorne et al. | 252—465 |
| 3,666,687 | 5/1972 | Croce et al. | 252—439 |

DELBERT E. GANTZ, Primary Examiner

J. M. NELSON, Assistant Examiner

U.S. Cl. X.R.

260—680 E